United States Patent
Gruber et al.

(10) Patent No.: US 6,742,736 B2
(45) Date of Patent: Jun. 1, 2004

(54) FISHING REEL

(75) Inventors: Gerhard Gruber, Meinheim (DE); Walter Baumgartner, Theilenhofen (DE)

(73) Assignee: Okuma Fishing Tackle Co., Ltd., Taiping (TW)

(*) Notice: Subject to any disclaimer, the term of this patent is extended or adjusted under 35 U.S.C. 154(b) by 0 days.

(21) Appl. No.: 10/447,959

(22) Filed: May 30, 2003

(65) Prior Publication Data

US 2004/0065760 A1 Apr. 8, 2004

(30) Foreign Application Priority Data

Oct. 2, 2002 (DE) .......................................... 102 46 242

(51) Int. Cl.$^7$ .............................................. A01K 89/01
(52) U.S. Cl. ...................................... 242/249; 242/242
(58) Field of Search ................................ 242/242, 249, 242/255, 263

(56) References Cited

U.S. PATENT DOCUMENTS

| | | | | | |
|---|---|---|---|---|---|
| 3,055,607 A | * | 9/1962 | Schultz | ........................ | 242/242 |
| 3,367,597 A | * | 2/1968 | Kenneth | ...................... | 242/242 |
| 4,339,095 A | * | 7/1982 | Gifford | ........................ | 242/242 |
| 5,358,091 A | | 10/1994 | Herzog | | |

FOREIGN PATENT DOCUMENTS

DE      40 35 846      6/1991

\* cited by examiner

*Primary Examiner*—Emmanuel Marcelo
(74) *Attorney, Agent, or Firm*—Browdy and Neimark, P.L.L.C.

(57) ABSTRACT

A fishing reel has a spool for retaining a line thereon, a transmission assembly for driving the spool reciprocated along an elongated orientation thereof and a crank for driving the transmission assembly to wind the line on the spool, wherein the transmission assembly has at least an elliptical wheel to make the line wound on the spool in a uniform distribution.

16 Claims, 6 Drawing Sheets

FISHING REEL

BACKGROUND OF THE INVENTION

1. Field of the Invention

The present invention relates generally to a fishing tool, and more particularly to a fishing reel capable of winding the line thereon in a uniform distribution.

2. Description of the Related Art

A conventional reel of the fishing rod has transmission assembly having a gear and guiding means with a straight slot. This kind of transmission assembly is applied to a spool with a narrower retainer. It is easy to understand that if the width of the retainer is increased but the diameter thereof is kept not changed, more fishing line can be wound on the spool. The spool, however, has more line wound at where adjacent to opposite ends thereof because the spool has lower speed at extremes of the reciprocating motion. The displacement speed of the spool is reduced to zero while it is running to the extremes of the reciprocating motion but the spool is kept a fixed rotary speed. That is why more line is wound at the portions adjacent to the opposite ends of the spool. Under such condition, the line always is snarled or tangled while the line is dragged out.

German patent DE 40 35 846 C2 disclosed an improved fishing reel capable of changing the speed of the reciprocating motion of the spool to make the line wound thereof in a uniform distribution. Such invention has a guiding device with an S-shaped slot and it is still not function well under the condition of the spool having a larger width. U.S. Pat. No. 5,356,091 disclosed another improved reel which the spool runs under a desirable reciprocating motion. Such invention has a complex structure which the structure is very sensitive to loading and it has a higher cost for manufacture.

SUMMARY OF THE INVENTION

The primary objective of the present invention is to provide a reel for a fishing rod, which the line is capable of being wound on the spool in a uniform distribution.

According to the objective of the present invention, claim 1 of the present invention defines a fishing reel comprising a spool for retaining a line thereon, a transmission assembly for driving the spool reciprocated along an elongated axis, and a crank for driving the transmission assembly to wind the line on the spool, wherein the transmission assembly has at least an elliptical wheel.

The main concept of the present invention is that the speed of the spool in reciprocating motion is variant in which the spool is accelerated at where adjacent to extremes of the reciprocating motion and is decelerated at where between the extremes. Under such condition, a line can be wound on the spool in a uniform distribution. The present invention still can wind the line on the spool in a uniform distribution while a retainer with larger width is applied. Under a condition of a constant length of the line being wound, a larger diameter spool is applied, the line wound on the spool has a larger radius of curvature that the line can be dragged out without any interference and can fly further.

The elliptical wheel is a transmission wheel which a periphery has a positive curvature and four or more acme points. For getting a uniform reciprocating motion, the elliptical wheel has two major half axis which are equal in lengths and two minor half axis which are also equal in lengths.

The crank drives the transmission assembly to drive the spool reciprocated. The crank also drives a rotor via a small gear to wind the line on the spool. Someone also provides a fixed rotor and a rotatable spool to wind the line.

In claim 2, the transmission assembly comprises a first wheel and a second wheel, wherein the second wheel has a post and the post is preferred to be provided at a periphery of the wheel in an eccentric condition to be engaged with a slot of a guiding device. The guiding device is provided at a core axle that connects with the spool. The post and the second wheel are preferred made into a single object. Such transmission assembly transforms a rotary motion of the crank into a linear reciprocating motion of the spool along an elongated axis.

There are many alternate designs under the concept of the present invention, such as the definition of claim 3 which the first and second wheels are both ellipses.

Two elliptical wheels transform a rotary motion with a constant speed into a rotary motion with variant speeds. The change of speed depends on foci of the elliptical wheels. Different combinations of amounts of the elliptical wheels can get different transmission ratio.

It also can get same function while only one elliptical wheel is provided. In claim 4, the second wheel is elliptical and the first wheel is round having an axis deviation for connection of the wheels. On the contrary, claim 5 defines the second wheel being an eccentric round wheel and the first wheel is elliptical. The first and second wheels also can be round and have an axis deviation respectively as defined in claims 15 and 16.

The elliptical wheel is preferred provided with an axle at a center thereof, or the elliptical wheel can be provided with an eccentric axle to get a larger change in speed.

For the purpose of accurately transmission of the rotary energy or the mechanical energy from the first wheel to the second wheel, both wheels are preferred gears as defined in claim 6. The transmission assembly, therefore, is a gear power transmission system in such condition and the axles of the gears are parallel and teeth of the gears are provided at peripheries thereof. The transmission assembly of the present invention is not limited only in gears, any transmission mechanism, such as belt, is acceptable.

The gears are preferred made of metal, but plastic gears reduce the weight of the reel. Plastic gears and bevel gears reduce noise while running. Teeth of the second gear are preferred double than teeth of the first gear as defined in claim 7, so that the transmission assembly has a transmission ratio of 2:1. Such ratio provides a quite reciprocating motion. The shape of the teeth of the gears is not the scope of the present invention.

One or more elliptical wheels keep a predetermined speed distribution of the reciprocating motion continuously so that the slot of the guiding device is simply a straight slot as defined in claim 8.

Claim 9 defines a curved slot according to the shapes of the elliptical wheels. The DE 40 35 846 C2 patent taught an S-shaped slot, please refer to the specification of the patent for detail, especially for claims 1–6.

Claim 10 defines a slot of the guiding device which an orientation thereof has an angle less than 90 degrees relative to the orientation of the reciprocating motion. Under such condition, the moving distance of the spool is increased to make more space in use.

In claim 11, the post on the periphery of the second wheel is adjacent to an acme point of the second wheel and has an included angle a relative to a side axle of the second wheel. Thus smaller second wheel can be applied. The included angle α is preferred as small as possible, such as smaller than 15 degrees.

In claim 12, a line of connection of the rotary axles of the first and second wheels is deviated from the elongated axis of the spool. In other words, there is an included angle φ between the line connected the rotary axle of the first wheel with a contact point of teeth thereof and a core axle. Such that the speed change while the spool moves forwards and backwards still makes the line wound thereon in a uniform distribution. Such structure makes more space in the reel for use and smaller the size thereof, and more particularly, it increases the stroke of the reciprocating motion.

The concept of the present invention can be carried out by the first and second wheels to form a gear power transmission system as described above, except that any transmission system, such as worm, is acceptable.

Claim 13 defines an elliptical driving wheel. The driving wheel drives a round worm to transform a rotary motion into a linear motion via a block engaged with the worm or a conventional eccentric transmission device. There is a deviation between the worm and the core axle to keep the elliptical driving wheel engaged with the worm. The driving wheel also drives a rotor to wind the line on the spool so that the rotor changes the speed thereof cyclically. Such design also makes the line wound on the spool in a uniform distribution.

In claim 14, the crank drives the first wheel via a transmission shaft. The transmission shaft has a third wheel to drive the rotor. It gets a stronger structure and a lower cost.

DETAILED DESCRIPTION OF THE INVENTION

Figure 1:
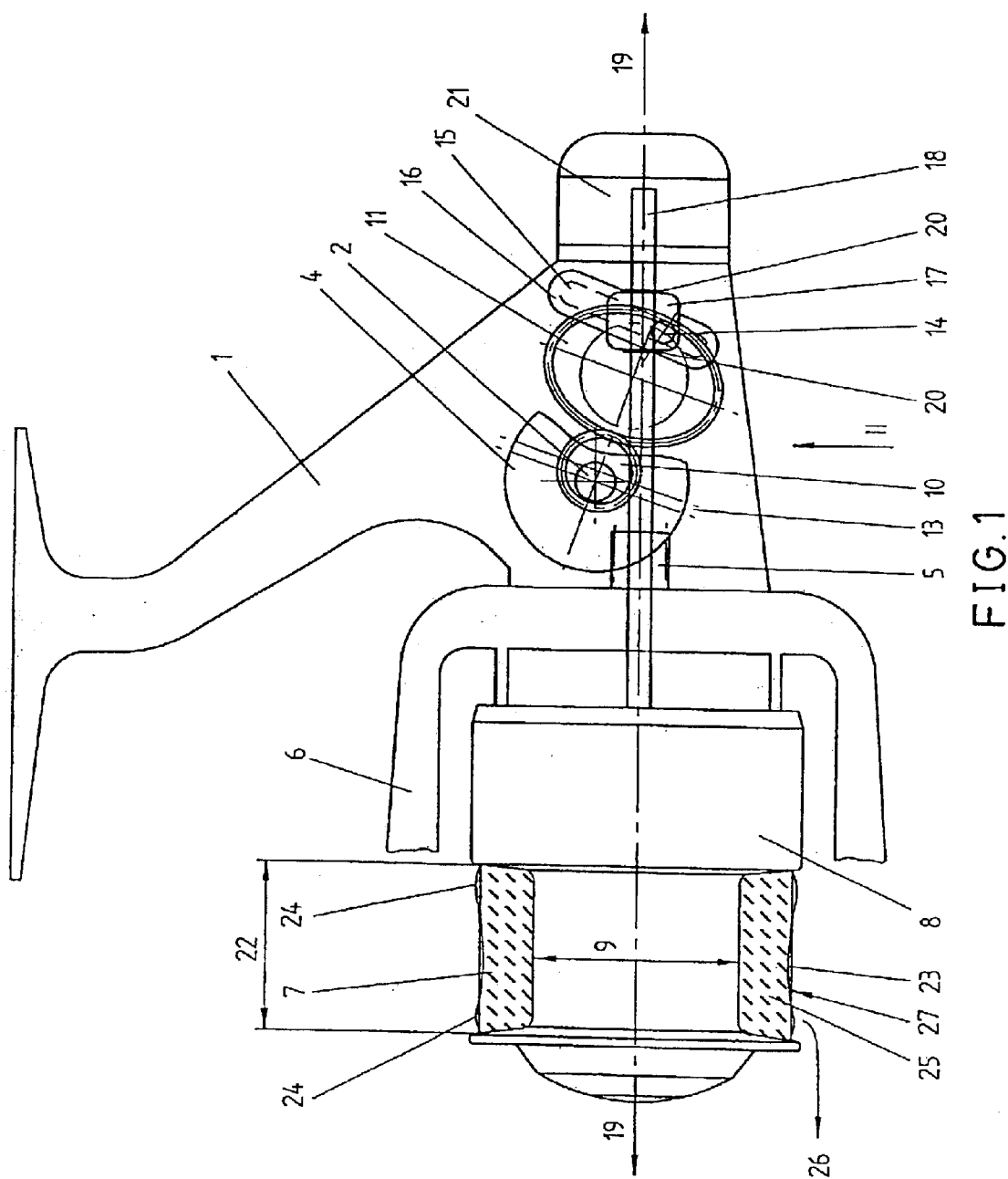
FIG. 1 is a lateral view of a first preferred embodiment of the present invention.
Figure 2:
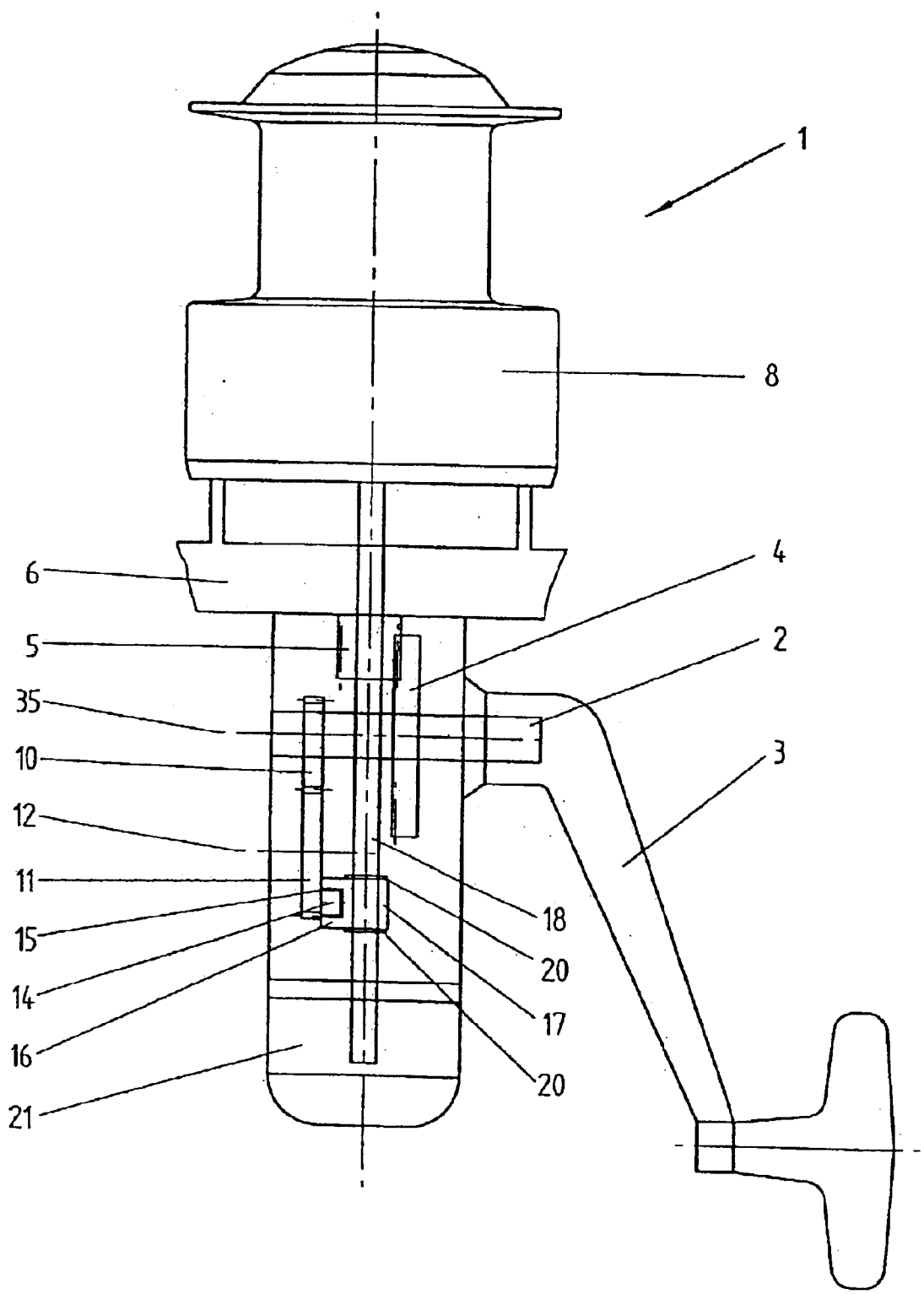
FIG. 2 is a lateral view along an arrow II in FIG. 1.

As shown in FIG. 1 and FIG. 2, a fishing reel 1 of the first preferred embodiment of the present invention comprises a transmission shaft 2 fixed with a crank 3 thereon to drive a third wheel 4. The third wheel 4 drives a rotor 6 of the reel 1 via a small gear 5 for rotation. The rotor 6 winds a line 7 onto a spool 8 with a predetermined diameter 9.

A first wheel 10 is a gear and is driven by the transmission shaft 2. The first wheel 10 is engaged with a second wheel 11 with a central rotary axle 12. The first and the second wheels 10 and 11 construct a transmission assembly. The first wheel 10 is round having an axis deviation 13. Teeth of the second wheel 11 are more than teeth of the first wheel 10, in other words, the rotary speed of the second wheel 11 is decreased, and further in other words, the rotary speed of the second wheel 11 is slower than the rotary speed of the crank 3.

The second wheel has a post 14 eccentrically provided at a side thereof. The post 14 is engaged with a slot 15 of a guiding device 16. The guiding device 16 is connected with a core axle 18 of the spool 8 via a connection portion 17 such that the guiding device 16 drives the spool 8 for reciprocating motion along an elongated axis 19. Two rings 20 are firmly connected with the core axle 18 and against the guiding device 16 at opposite sides of the connection portion 17 respectively. If necessary, the core axle 18 rotates along a central axis thereof and a braking device 21 is provided at a casing of the reel at a rear side of the spool 8.

While a width 22 of the retainer 23 is larger than a predetermined size, more fishing line 7 is wound at where adjacent to opposite ends of the retainer 23 respectively and forms two bulge 24. The line 7 is snarled while it is dragged out along an orientation 26. In the present invention, a wound line 25 has a flat outer surface 27.

Figure 3:
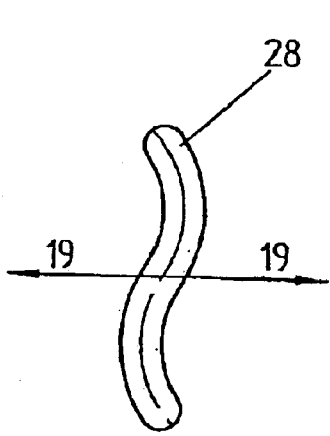
FIG. 3 shows the slot of the DE 40 35 846 C2 patent.
Figure 4:
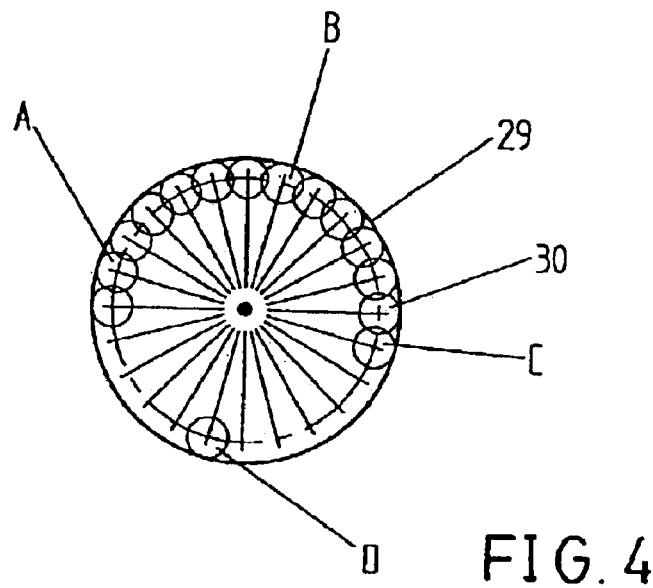
FIG. 4 shows a diagram of the path of motion of the post of the DE 40 35 846 C2 patent.
Figure 5:
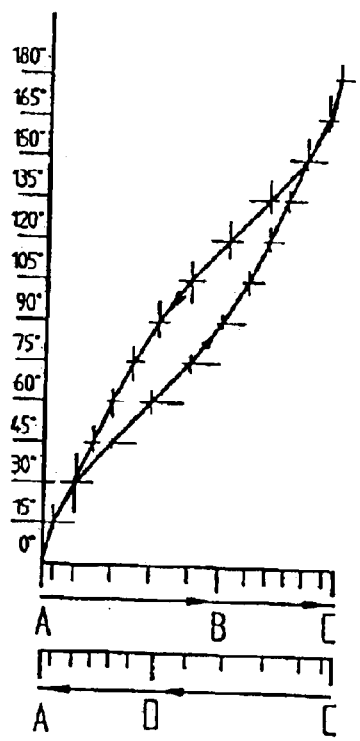
FIG. 5 shows a diagram of the path of motion of the post of the DE 40 35 846 C2 patent.

FIG. 3 shows a slot 28 of the prior art of German patent DE 40 35 846 C2 and FIG. 4 shows the path of motion 29 which a post rotates from a position A for 360 degrees of rotation and plural of semi-positions 30 of the post, wherein an orientation of an elongated axis 19 is horizontal. FIG. 5 shows the path of motion of the post engaged with the slot 28, wherein the x-coordinates show the distance of the reciprocation and the y-coordinate shows the relative angle of the post.

FIG. 4 and FIG. 5 show positions A, B, C and D of the post which the positions are the post and the second wheel rotating for every 90 degrees, wherein the positions A and C are extremes of the reciprocating motion. The post has to rotate for 90 degrees from one of the positions to the next position. Because the second wheel is pivoted on a shaft firmly fixed on the casing of the reel, in other words, the second wheel has no movement relative to the casing. The spool completes the reciprocating motion for one time while the second wheel rotates for 360 degrees.

There are two x-coordinates in FIG. 5, wherein the upper one shows the posting reciprocating from the position A, via the position B to the position C and the lower one shows the posting reciprocating from the position C, via the position D and back to the position A. The post is accelerated at the position A and the position C, which are the extremes of the reciprocating motion, and is decelerated at the position B and the position D.

Figures 6, 7:
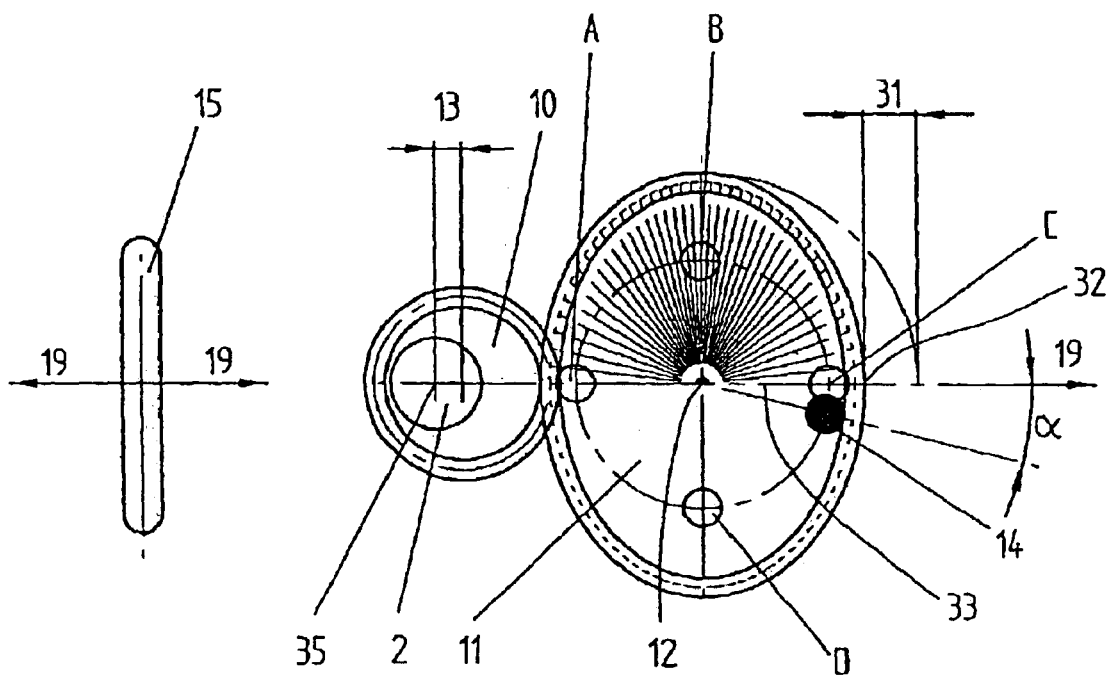
FIG. 6 shows a slot of a second preferred embodiment of the present invention.
FIG. 7 shows a diagram of the path of motion of the post of the second preferred embodiment of the present invention.
Figure 8:
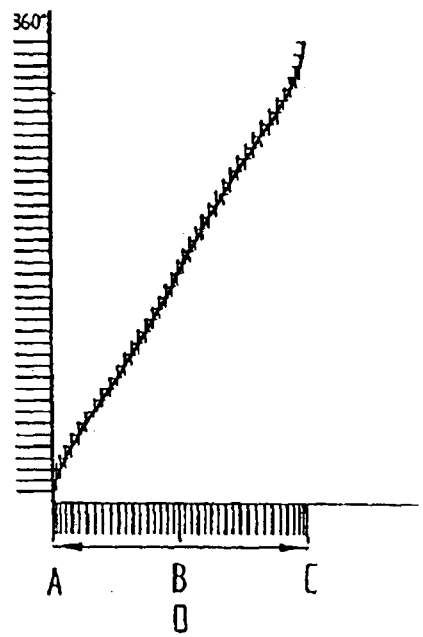
FIG. 8 shows a diagram of the path of motion of the post of the second preferred embodiment of the present invention.

To compare with the prior art, the second preferred embodiment of the present invention is shown in Figures from FIG. 6 to FIG. 8. FIG. 6 shows a straight slot 15 having an elongated orientation perpendicular to the elongation axis 19. FIG. 7 shows a first wheel 10 and an elliptical second wheel 11, wherein the first wheel 10 is round having an axis deviation 13 to keep the first wheel 10 engaged with the second wheel 11. The deviation 13 is substantial equal to half of a major axle of the ellipse less a minor axle of the ellipse of the second wheel 11. Teeth of the second wheel 11 are double than teeth of the first wheel 10 so that the wheels have a transmission ratio of 2:1. The second wheel 11 rotates with a varied rotary speed while the crank 3 rotates in a uniform rotary speed.

FIG. 8 shows a motion path of the post 14. The post 14 is firmed fixed to the second wheel 11 to drive the guiding device 16 moving from the position A, via the position B, to the position C and back to the position A from the position C via the position D. The change of angle per unit time is varied continuously, wherein the change of angle per unit time is decreased from the position A to the position B and from the position C to the position D and the change of angle per unit time is increased from position B to the position C and from the position D to the position A. In other words, the second wheel 11 and the post 14 are decelerated from the position A to the position B and from the position C to the position D and are accelerated from position B to the position C and from the position D to the position A.

The above speed curve and the speed curve of the transmission assembly running are overlapped, which means every rotation of the crank 3 making the spool 8 having a constant running, so that the wound line 8 is wound on the spool in a uniform distribution and the post 14 is deviated an angle a from a side axis 33 of a top acme point 32 of the second wheel 11. FIG. 8 shows a corresponding diagram of reciprocating motion.

Figures 9, 10:
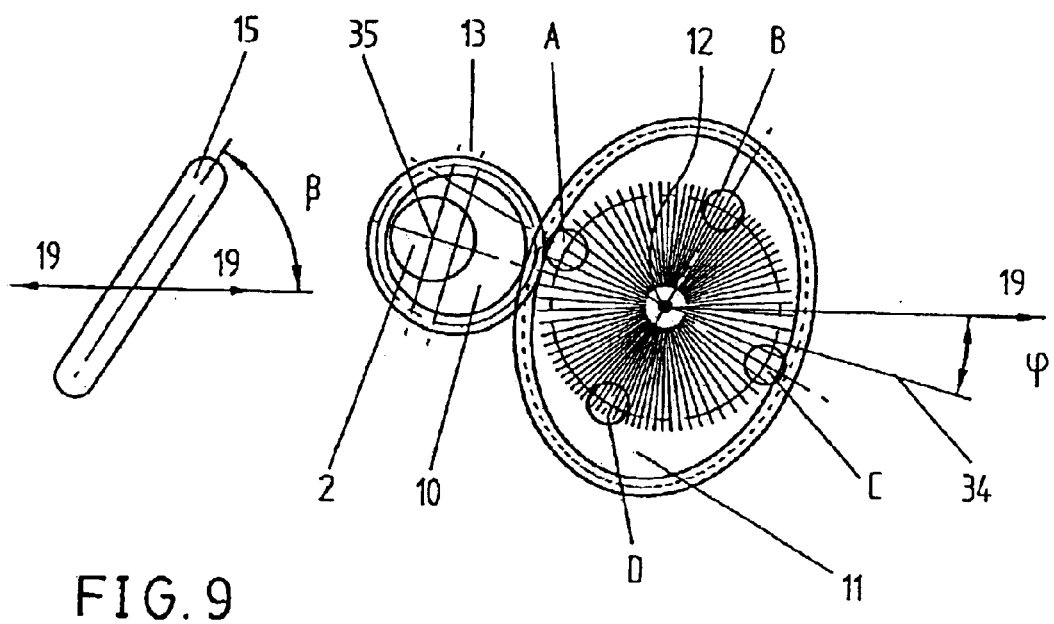
FIG. 9 shows a slot of the first preferred embodiment of the present invention.
FIG. 10 shows a diagram of the path of motion of the post of the first preferred embodiment of the present invention.
Figure 11:
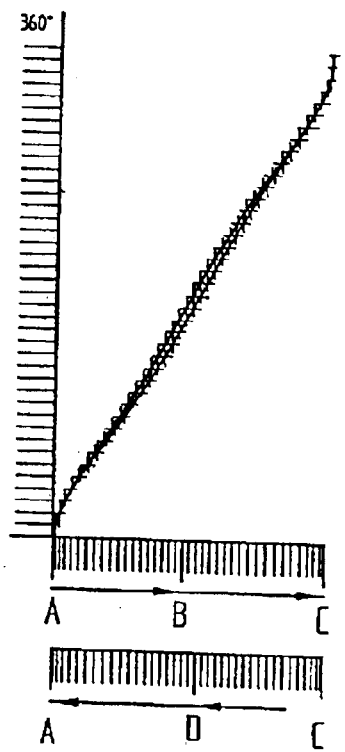
FIG. 11 shows a diagram of the path of motion of the post of the first preferred embodiment of the present invention.

Figures from FIG. 9 to FIG. 11 shows the first preferred embodiment of the present invention, referring to FIG. 1, the slot 15 is deviated from the original position which an included angle β is formed at between the slot 15 and the core axle 18 (or the elongated axis 19) so that the stroke of the reciprocating motion of the spool 8 is increased. There is an included angle φ between extensions of the axes 35 and 12 of the first wheal 10 and the second wheel 11 (or the axle of the transmission assembly) as shown in FIG. 11. Such structure makes the path of motion changed but there is compensation for the deviations of moving forwards and backwards so that the line still wound on the spool in a uniform distribution.

Figure 12:
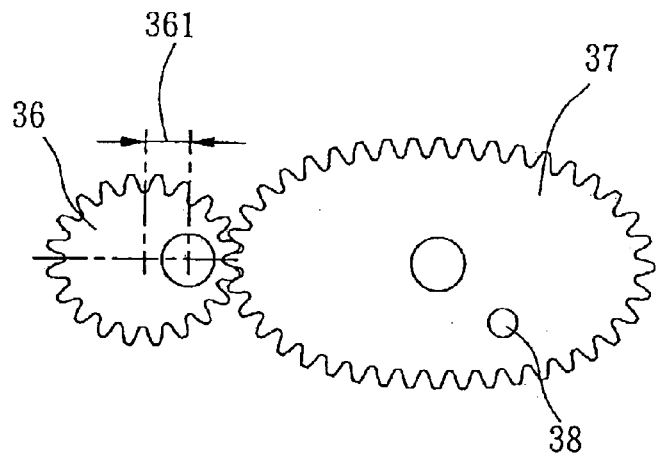
FIG. 12 shows the transmission assembly of a third preferred embodiment of the present invention.
Figure 13:
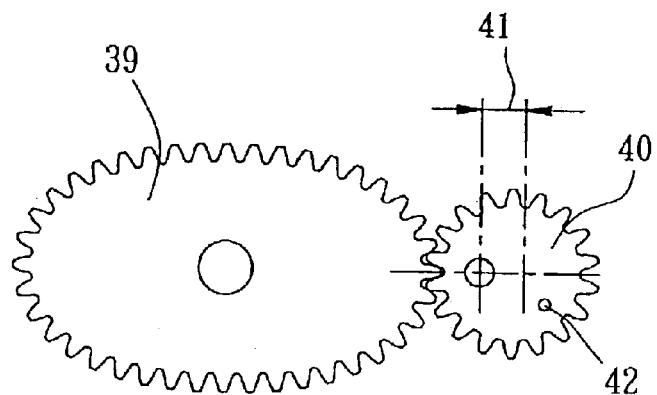
FIG. 13 shows the transmission assembly of a fourth preferred embodiment of the present invention.
Figure 14:
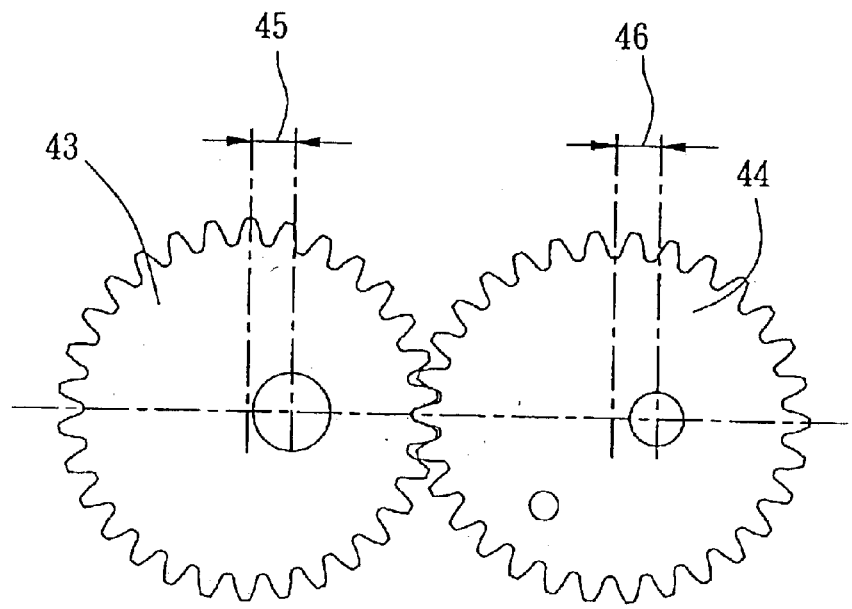
FIG. 14 shows the transmission assembly of a fifth preferred embodiment of the present invention.

There are plural of designs according to the concept of the present invention. As shown in FIG. 12, a fishing reel of the third preferred embodiment of the present invention comprises a transmission assembly having an elliptical first wheel 36 and an elliptical second wheel 37 engaged with the first wheel 36, wherein the first wheel 36 has an axis deviation 361 and the second wheel 37 has a post 38 thereon. As shown in FIG. 13, a fishing reel of the fourth preferred embodiment of the present invention comprises a transmission assembly having an elliptical first wheel 39 and a round second wheel 40 engaged with the first wheel 39, wherein the second wheel 40 has an axis deviation 41 and the second wheel 40 has a post 42 thereon. FIG. 14 shows a fishing reel of the fifth preferred embodiment of the present invention which a transmission assembly has a round first wheel 43 and a round second wheel 44 engaged with the first wheel 43, wherein the first and second wheels 39 respectively have an axis deviation 45 and 46. The alternate structures as described above are within the scope of the present invention.

What is claimed is:

1. A fishing reel, comprising:
a spool for retaining a line thereon;
a transmission assembly for driving the spool reciprocated along an elongated axis, and
a crank for driving the transmission assembly to wind the line on the spool;
wherein the transmission assembly has at least an elliptical wheel.

2. The fishing reel as defined in claim 1, wherein the transmission assembly has a first wheel driven by the crank and a second wheel engaged with the first wheel and driven by the first wheel, wherein the second wheel has a post engaged with a slot of a guiding device and the spool has a core axle connected with the guiding device.

3. The fishing reel as defined in claim 2, wherein the first wheel and the second wheel are substantially elliptical.

4. The fishing reel as defined in claim 2, wherein the second wheel is substantially elliptical and the first wheel is round and has a predetermined axis deviation.

5. The fishing reel as defined in claim 2, wherein the first wheel is substantially elliptical and the second wheel is round and has a predetermined axis deviation.

6. The fishing reel as defined in claim 2, wherein the first wheel and the second wheel are gears engaged with each other.

7. The fishing reel as defined in claim 6, wherein teeth of the second wheel are more than teeth of the first wheel.

8. The fishing reel as defined in claim 2, wherein the slot of the guiding device is straight.

9. The fishing reel as defined in claim 2, wherein the slot of the guiding device is curved.

10. The fishing reel as defined in claim 2, wherein an included angle β between an extension of the slot and the elongated axis of the spool is smaller than 90 degrees.

11. The fishing reel as defined in claim 2, wherein a line connected the post of the second wheel and a rotary axle is deviated from a side axis of the second wheel an included angle α.

12. The fishing reel as defined in claim 2, wherein an axle of the transmission assembly running through rotary axles of the first wheel and the second wheel is deviated from the core axle of the spool an included angle φ.

13. The fishing reel as defined in claim 2, wherein the crank drives the first wheel for rotation via a transmission shaft and the transmission shaft has third wheel to drive a rotor for rotation whereby the line is wound on the spool.

14. The fishing reel as defined in claim 1, wherein the transmission assembly comprises an elliptical driving wheel driven by the crank and a round worm having an axis deviation relative to the elongated axis.

15. A fishing reel, comprising:
a spool for retaining a line thereon;
a transmission assembly for driving the spool reciprocated along an elongated axis, and
a crank for driving the transmission assembly to wind the line on the spool;
wherein the transmission assembly has at least a round wheel having a predetermined axis deviation.

16. The fishing reel as defined in claim 15, wherein the transmission assembly has a first wheel driven by the crank and a second wheel engaged with the first wheel and driven by the first wheel, wherein the second wheel has a post engaged with a slot of a guiding device and the spool has a core axle connected with the guiding device and the first wheel and the second wheel are round and respectively have a predetermined axis deviation.

* * * * *